United States Patent
Van Druten

(10) Patent No.: US 12,497,133 B2
(45) Date of Patent: Dec. 16, 2025

(54) TRANSMISSION SYSTEM FOR A BICYCLE

(71) Applicant: CLASSIFIED CYCLING BV, Antwerp (BE)

(72) Inventor: Roëll Marie Van Druten, Eindhoven (NL)

(73) Assignee: CLASSIFIED CYCLING B.V., Antwerp (BE)

( * ) Notice: Subject to any disclaimer, the term of this patent is extended or adjusted under 35 U.S.C. 154(b) by 0 days.

(21) Appl. No.: 18/294,047

(22) PCT Filed: Aug. 2, 2022

(86) PCT No.: PCT/EP2022/071751
§ 371 (c)(1),
(2) Date: Jan. 31, 2024

(87) PCT Pub. No.: WO2023/012188
PCT Pub. Date: Feb. 9, 2023

(65) Prior Publication Data
US 2025/0083768 A1    Mar. 13, 2025

(30) Foreign Application Priority Data

Aug. 2, 2021   (NL) ..................................... 2028904

(51) Int. Cl.
*B62M 9/10*    (2006.01)
*B62M 6/50*    (2010.01)
*B62M 6/65*    (2010.01)

(52) U.S. Cl.
CPC .............. *B62M 9/105* (2013.01); *B62M 6/50* (2013.01); *B62M 6/65* (2013.01)

(58) Field of Classification Search
CPC .......... B62M 25/08; B62M 6/50; B62M 6/65; B62M 9/105; B62M 9/14
(Continued)

(56) References Cited

U.S. PATENT DOCUMENTS 702,948 A  *  6/1902  Hodgkinson  ............ B62M 9/10
                                                   474/77
2,117,116 A  *  5/1938  Page  ........................ B62M 9/14
                                                   474/77
(Continued)

FOREIGN PATENT DOCUMENTS

CA    2842126 A1    8/2015
EP    2930096 A1   10/2015
(Continued)

OTHER PUBLICATIONS

International Search Report dated Jan. 26, 2023, issued in corresponding International Application No. PCT/EP2022/071751 (5 pgs.).

(Continued)

*Primary Examiner* — Henry Y Liu
(74) *Attorney, Agent, or Firm* — Pillsbury Winthrop Shaw Pittman, LLP

(57) ABSTRACT

A transmission system for a bicycle, wherein the system comprises a driver element configured and arranged to rotate about an axis. The transmission system comprises a cassette of sprockets mounted on the driver element to rotate together. The transmission system comprises a shifting unit arranged to move the cassette of sprockets in axial direction on the driver element. The shifting unit comprises an actuator element arranged to actuate the movement of the cassette of sprockets on the driver element. The actuator element is at least partially positioned between the driver element and the axis, and/or the actuator element is at least partially positioned in axial direction next to the driver element.

22 Claims, 8 Drawing Sheets

(58) Field of Classification Search
USPC .................................................. 474/73, 77
See application file for complete search history.

(56) References Cited

U.S. PATENT DOCUMENTS

| | | | | |
|---|---|---|---|---|
| 3,769,848 | A * | 11/1973 | McGuire | B62M 9/14 474/70 |
| 4,571,219 | A * | 2/1986 | Breden | B62M 25/00 474/70 |
| 4,713,042 | A * | 12/1987 | Imhoff | B62M 9/14 474/69 |
| 7,258,637 | B2 * | 8/2007 | Thomasberg | B62M 9/14 474/160 |
| 10,494,056 | B2 * | 12/2019 | Kakinoki | B62M 25/08 |
| 11,027,793 | B2 * | 6/2021 | Lin | B62M 9/14 |
| 11,440,346 | B2 * | 9/2022 | Kamada | B62M 11/16 |
| 11,541,963 | B2 * | 1/2023 | Schuster | B62M 9/12 |
| 11,661,145 | B2 * | 5/2023 | Schuster | F16H 55/54 477/47 |
| 2013/0184115 | A1 * | 7/2013 | Urabe | B62M 11/10 475/193 |
| 2014/0235383 | A1 * | 8/2014 | Wesling | B62M 25/08 474/80 |
| 2019/0135376 | A1 * | 5/2019 | Kakinoki | B62M 9/122 |
| 2020/0223255 | A1 * | 7/2020 | Kamada | B60B 27/04 |

FOREIGN PATENT DOCUMENTS

| | | |
|---|---|---|
| WO | 00/68068 A1 | 11/2000 |
| WO | 2018/199757 A2 | 11/2018 |
| WO | 2020/085911 A2 | 4/2020 |

OTHER PUBLICATIONS

Written Opinion of the International Searching Authority dated Jan. 26, 2023, issued in corresponding International Application No. PCT/EP2022/071751 (16 pgs.).

* cited by examiner

TRANSMISSION SYSTEM FOR A BICYCLE

CROSS-REFERENCE TO RELATED APPLICATIONS

This application is the national stage entry of PCT/EP2022/071751, filed Aug. 2, 2022, which claims priority to Netherlands Application No. 2028904, filed Aug. 2, 2021, the entire contents of each of which are herein incorporated by reference in their entireties.

FIELD OF THE INVENTION

The present invention relates to a transmission system for a bicycle. In particular, the invention relates to a transmission system for a bicycle comprising a cassette of sprockets for meshing with a chain or belt.

BACKGROUND TO THE INVENTION

Bicycle transmission systems are generally used in various types of bicycles. Whether the bicycle is used for recreation, transportation or competition purposes, many bicycles comprise a transmission system that is operable according to various transmission ratios.
Commonly used bicycle transmission systems comprise a rear cassette of sprockets mounted on a hub of a rear wheel. An endless drive member, such as a chain or belt, meshes with any one of the sprockets of the rear cassette and a front chain wheel which is connected to a crank. A derailleur is used to shift an endless drive member between the sprockets of the cassette, so as to change the transmission ratio of the bicycle transmission. The derailleur is typically mounted to a frame of the bicycle, and movable relative to the frame by means of an actuator. An alternative to derailleurs is a gear shifting mechanism inside the hub of a rear wheel.

The movement of the endless drive member between the sprockets of the cassette causes said endless drive member to be oriented differently in each gear. Hence, at least for some sprockets, the endless drive element is loaded in suboptimal orientation. Particularly when meshing with one of the outermost positioned sprockets, the endless drive member extends askew between the front chain wheel and the rear cassette, which adds considerable friction losses to the drive train, and thus lowers its overall efficiency. It furthermore increases wear of the endless drive member as well as of the sprockets and front chain wheel.

SUMMARY OF THE INVENTION

It is an object to provide a transmission system for a bicycle, that obviates, or at least diminishes the disadvantage mentioned above. More in general, it is an object to provide an improved transmission system for a bicycle.

Thereto, according to a first aspect is provided a transmission system for a bicycle. The transmission system for a bicycle comprises a cassette of sprockets including at least a first and a second sprocket. The cassette of sprockets is configured to rotate about a rotational axis. The transmission system further comprises a first actuator configured to move the cassette in an axial direction of the rotational axis. Optionally, the transmission system comprises a driver element configured and arranged to rotate about the rotational axis. The driver element can e.g. have the form of a hollow cylinder. The driver element can be arranged coaxially with respect to a bicycle wheel. The cassette of sprockets may be mounted on the driver element to rotate together about the rotational axis. It will be appreciated that the cassette of sprockets forms a cluster of sprockets. Some or all of the sprockets of the cassette may integrated with each other into a single body. Some or all of the sprockets of the cassette may be separate, and may be fixed or fixable to other sprockets of the cassette. The driver element for example comprises axial splines for cooperating with complementary splines of the cassette. The cassette of sprockets can be mounted on the driver element using locking means, such as a locking ring. Optionally, the transmission system comprises a shifting unit arranged to move the cassette of sprockets in axial direction on the driver element. The cassette of sprockets can be arranged to shift in axial direction relative to the driver element. The shifting unit can be activated in response to a driver command, such as by means of a manually operable shifter of a bicycle. The shifting unit optionally comprises an actuator element arranged to actuate the movement of the cassette of sprockets on the driver element. The actuator element may be at least partially positioned between the driver element and the axis, and/or the actuator element may be at least partially positioned in axial direction next to the driver element. The actuator element can comprise force generating means to drive the cassette of sprockets in axial direction.

The transmission system hence enables the endless drive member to be optimally aligned to any one of the sprockets. By axially moving the cassette, any one of the sprockets can be selected to mesh with the endless drive member, while, at least substantially, maintaining an optimal orientation of the endless derive member, e.g. a substantially straight chain line. In particular, the endless drive member can be, at least substantially, maintained in a drive plane, wherein any one of the sprockets of the cassette can be axially moved so as to align a sprocket plane in which a particular sprockets extends with the drive plane. Transfer of the endless drive member from one sprocket to another, upon axial movement of the cassette, may be induced by rotating the cassette about the axis. The transfer of the endless drive member may be facilitated by a geometry and relative arrangement of the sprockets, e.g. by means of shift ramps.

For example, the transmission system comprises a driver element configured and arranged to rotate about an axis; a cassette of sprockets mounted on the driver element to rotate together; and a shifting unit arranged to move the cassette of sprockets in axial direction relative to the driver element, wherein the shifting unit comprises an actuator element arranged to actuate the movement of the cassette of sprockets on the driver element, wherein the actuator element is at least partially positioned between the driver element and the axis, and/or wherein the actuator element is at least partially positioned in axial direction next to the driver element.

Optionally, the system further comprises an axle coaxially arranged with respect to the driver element, and wherein the driver element is rotatable around the axle about the axis. The axis can coincide with a wheel axis of a bicycle, such as a rear wheel axis. The axle may for be a thru-axle arranged for securing a wheel, e.g. a rear wheel, between a pair of dropouts on a bicycle frame. The axle may, in use, be stationary relative to the bicycle frame.

Optionally, the actuator element is positioned between the driver element and the axle. The actuator element and the driver element can be positioned diametrically adjacent. The actuator element and the axle can be positioned diametrically adjacent.

Optionally, the actuator element is mounted on the axle. The axle can be at least partially formed by a wheel axle, such as a rear wheel axle.

Optionally, the actuator element is positioned inside the axle. The axle may for example comprise a cavity for receiving the actuator element therein.

Optionally, the actuator element is positioned on the driver element. The actuator element may for example corotate with the driver element.

Optionally, the actuator element comprises an electric actuator and/or electric motor.

Optionally, the actuator element is powered by a power source, such as an electric power source. The power source can be mounted on or inside the axle. The power source may for example include a battery.

Optionally, the system further comprises a torque transfer element arranged to transfer torque from the cassette of sprockets to the driver element in a rotational direction about the axis and to allow for a relative axial movement between the cassette of sprockets and the driver element. The torque transfer element may for example be formed by or include one or more axial splines.

Optionally, the torque transfer element comprises a spring member arranged to flex in axial direction for allowing the relative axial movement between the cassette of sprockets and the driver element. The spring member can be arranged to transfer torque in a tangential direction about the axis, e.g. the spring element can be stiff, or substantially rigid, in tangential direction for transferring torque between the cassette and the driver element. The spring member for instance comprises a diaphragm spring, or coil spring. The spring member may be arranged to bias the cassette of sprockets in axial direction.

Optionally, the system further comprises a position sensor arranged to sense a relative position of the cassette of sprockets and the driver element. The position sensor can be an electrical position sensor, an optical sensor and/or an magnetic position sensor.

Optionally, the system further comprises a force transfer element arranged for transferring a force in axial direction between the actuator element and the cassette of sprockets. The force transfer element can transfer force into movement of the cassette of sprockets in axial direction on the driver element. The force transfer element may be arranged to not transfer torque between the cassette and the actuator element and/or the drive element. Hence, the force element may be arranged to only transfer force in axial direction between the actuator element and the cassette of sprockets. The force transfer element may extend from the actuator element to a free end, through an opening in the driver element, wherein at the free end, the force transfer element is couplable to the cassette. The force transfer element and the actuator element can be axially slidably coupled for allowing a relative motion in axial direction. The force transfer element can also be slidably arranged relative to the cassette and the driver element in tangential direction about the axis to allow a relative rotation between the force transfer element and the cassette.

Optionally, the force transfer element is rotationally coupled to the driver element.

Optionally, the position sensor is positioned between the force transfer element and the axle. Sensor data from the position sensor can be used for accurately controlling the positioning of the cassette.

Optionally, the shifting unit is actuated using a force generated by rotation of the driver element. The shifting unit can be actuated semi-automatically. Shifting of the endless drive member from one sprocket to another, upon axially movement of the cassette, may be induced by a rotation of the driver element. Shifting of the endless drive member may be facilitated by a geometry and relative arrangement of the sprockets of the cassette, e.g. by means of shift ramps.

Optionally, the shifting unit is actuated using energy generated by rotation of the driver element or the hub shell.

Optionally, the sprockets are spaced equidistantly from each other in axial direction.

Optionally, the sprockets are axially spaced from each other with a distance of less than 3.5 mm, preferably less than 3.3 mm, more preferably less than 3.0 mm. As the transmission system allows the endless drive member to be substantially straight for all gears, a very compact cassette can be obtained with relatively small axial spacing between adjacent the sprockets. Such close spacing between the sprockets also limits the required axial travelling distance of the cassette for changing gears.

Optionally, the cassette of sprockets comprises at most 9 sprockets, such as at most 8, 7, 6 or 5 sprockets.

Optionally, the system further comprises an endless drive member, such as a chain or belt, for selectively engaging any one the sprockets of the cassette of sprockets.

Optionally, the system further comprises a tensioner for tensioning the endless drive member. The tensioner may be mounted to the bicycle frame, and may be stationary relative to the bicycle frame.

Optionally, the tensioner comprises a cage member with two pulley wheels rotatably coupled thereto, and a spring for biasing the cage member.

Optionally, the cage member is pivotable around a first pivot axis, which first pivot axis extends parallel to the wheel axle, e.g. concentric or eccentric to the wheel axle.

Optionally, the cage member includes a first pivot arm arranged for pivoting about the first pivot axis.

Optionally, the cage member includes a second pivot arm, axially spaced apart from the first pivot arm, wherein the first and second pivot arms are, e.g. independently, pivotable about the first pivot axis.

Optionally, the tensioner comprises a base member pivotably mounted to the cage member, wherein the base member is pivotable about a second pivot axis, which second pivot axis extends parallel to the wheel axle, e.g. concentric or eccentric to the wheel axle.

Optionally, the first pivot axis and the second pivot axis coincide.

Optionally, the base member includes a third pivot arm pivotable around the second pivot axis.

Optionally, the base member includes a fourth pivot arm, axially spaced apart from the third pivot arm, wherein the third and the fourth pivot arm are, e.g. independently, pivotable about the second pivot axis.

Optionally, the tensioner further comprises a friction element arranged to generate friction in at least one rotation direction of about the first and/or second pivot axis.

Optionally, the system further comprises a hub transmission for imposing at least a first transmission ratio and a second transmission ratio between the driver element and a wheel of the bicycle, and/or between the cassette of sprockets and the driver element. Optionally, the hub transmission is at least partially positioned in axial direction next to the driver element. The hub transmission and the cassette of sprockets may be serially arranged. Hence a plurality of system transmission ratios can be obtained with the axially movable cassette of sprockets and the hub transmission. For example, the hub transmission may provide intermediate transmission ratios between the transmission ratios obtained with adjacent sprockets. Hence, the cassette of sprockets can for instance provide a large range of transmission ratios with relatively large ratio steps, wherein the hub transmission provides intermediate ratio steps therebetween.

Optionally, the hub transmission has a hub transmission input and a hub transmission output, and comprises a planetary gear system comprising a first ring gear, a planet carrier, and a second ring gear, wherein the second ring gear is rotationally coupled to the hub transmission output, wherein the hub transmission input drives the first ring gear in rotation, and the first ring gear drives the second ring gear in rotation via planet wheels carried by the planet carrier for forming a second transmission ratio. Hence, the planetary gear system may not include a sun gear, i.e. the planetary gear system may be a sunless planetary gear system.

Optionally, the hub transmission has a hub transmission input and a hub transmission output, and comprises a planetary gear system comprising a first sun gear, a planet carrier, and a second sun gear, wherein the second sun gear is rotationally coupled to the hub transmission output, wherein the hub transmission input drives the first sun gear in rotation, and the first sun gear drives the second sun gear in rotation via planet wheels carried by the planet carrier for forming a second transmission ratio. Hence, the planetary gear system may not include a ring gear, i.e. the planetary gear system may be a ringless planetary gear system.

Optionally, the hub transmission has a hub transmission input and a hub transmission output, and comprises a planetary gear system wherein the planetary gear system comprise a first ring gear, a planet carrier, and a second ring gear, wherein the second ring gear is rotationally coupled to the hub transmission output, wherein the hub transmission input drives the first ring gear in rotation, and the first ring gear drives the second ring gear in rotation via planet wheels carried by the planet carrier for forming a second transmission ratio, or wherein the planetary gear system comprise a first sun gear, a planet carrier, and a second sun gear, wherein the second sun gear is rotationally coupled to the hub transmission output, wherein the hub transmission input drives the first sun gear in rotation, and the first sun gear drives the second sun gear in rotation via planet wheels carried by the planet carrier for forming a second transmission ratio. Hence, the planetary gear system may be either be a sunless planetary gear system or a ringless planetary gear system.

Optionally, the hub transmission may comprise an intermediate shell arranged for detachably coupling to a hub shell.

It will be appreciated that the hub transmission described herein need not be combined with an axially movable cassette as described herein. For example, the hub transmission may be used in combination with a cassette of sprockets that is not axially movable, e.g. a cassette of sprockets of only one sprocket.

Optionally, the system further comprises a hub shell, and wherein the hub transmission is contained by the hub shell.

Optionally, the hub transmission is removably couplable to the hub shell. The coupling can be ensured by clamping means.

Optionally, the system further comprises a first freewheel arranged between the driver element and an input of the hub transmission to allow a free relative rotation between the driver element and the hub transmission input in one rotation direction and transmit torque in a second rotation direction opposite the first direction.

Optionally, the first transmission ratio of the hub transmission is 1:1.

Optionally, the first and second hub transmission ratios differ from each other by at least 30%.

Optionally, the first and second hub transmission ratios differ from each other by an amount that corresponds to approximately half of a sprocket ratio of a pair of consecutive sprockets of the cassette of sprockets.

Optionally, the second hub transmission ratio is a reduction ratio, lowering the hub transmission output speed with respect to the hub transmission input speed.

Optionally, the second hub transmission ratio is an increase ratio, increasing the hub transmission output speed with respect to the transmission input speed.

Optionally, at least one of the hub transmission ratios is adjustable.

Optionally, the system is configured to adapt the timing of the axial movement of the cassette of sprockets on the driver element to a location of a shift ramp of the sprockets. This adaptation of the timing of the axial movement of the cassette with a location of the shift ramps of the sprockets can allow for more rapid and smooth shifting.

Optionally, the system further comprises a control unit for controlling a transmission ratio change of the transmission system, controlling the actuator element for actuating the movement of the cassette of sprockets on the driver element and/or a further actuator element for actuating a transmission ratio change of the hub transmission.

Optionally, the control unit is integrated with the actuator element.

Optionally, the system comprises a battery for powering the control unit, the actuator element and/or the further actuator element.

Optionally, the control unit includes a power saving mode in which the control unit is deactivated upon detection of an absence of a movement a component of the system during a predefined time period and wherein the control unit is reactivated upon detection of a movement of the component of the system.

Optionally, the control unit is attached to the axle.

Optionally, the control unit is positioned contained by the hub shell.

Optionally, the control unit comprises a receiver arranged for receiving a wireless shift signal from a shifter and/or control unit of the bicycle.

Optionally, the actuator element comprises a receiver arranged for receiving a wireless shift signal from a shifter and/or control unit of the bicycle.

Optionally, the receiver is detachably mounted to the axle. This allows for a wheel change without having to change the receiver, which may have been paired with a transmitter.

Optionally, the receiver is arranged to be paired with a wireless transmitter. The wireless transmitter may be attached to the bicycle frame and/or handlebar.

Optionally, the control unit is configured to selectively control the actuator element and/or the further actuator for selecting the next higher transmission ratio in response to receiving an upshift signal, and for selecting the next lower transmission ratio in response to receiving a downshift signal.

Optionally, the control unit is arranged to delay a shifting of the hub transmission by a predefined time period after initiating a movement of the cassette of sprockets.

Optionally, the system further comprises an electric propulsion motor arranged for propelling the bicycle and/or an electric generator arranged for generating power.

Optionally, the electric motor is coupled to the hub shell. The electric motor can be configured to aid in driving the bicycle and/or shifting the bicycle transmission.

Optionally, the electric motor is coupled to a crank and/or chainring of the bicycle.

Optionally, the sprocket ratio steps between each pair of consecutive sprockets are at least 10%.

Optionally, the sprocket ratio steps between each pair of consecutive sprockets are at least 12%.

Optionally, the sprocket ratio steps between each pair of consecutive sprockets are at least 15%.

Optionally, the hub transmission is a continuously variable transmission.

Optionally, the hub transmission is a ratchet type of continuously variable transmission.

Optionally, a transmission ratio-spread of the continuously variable transmission is smaller than the sprocket ratio step between a pair of consecutive sprockets.

Optionally, a transmission ratio-spread of the continuously variable transmission is smaller than the sprocket ratio step between three consecutive sprockets.

Optionally, the continuously variable transmission has at least a transmission ratio of 1:1, and an increase ratio increasing the hub transmission output speed with respect to the transmission input speed.

Optionally, an input of the continuously variable transmission is coupled to the driver element and an output of the continuously variable transmission is coupled to the hub shell.

Optionally, an input of the continuously variable transmission is coupled to the cassette of sprockets and an output of the continuously variable transmission is connected to the driver element.

Optionally, an input of the continuously variable transmission is coupled to a crank of the bicycle and an output of the continuously variable transmission is connected to a front chainring of the bicycle.

According to a second aspect is provided a bicycle comprising a transmission system according to abovementioned description of the present application.

Optionally, the bicycle comprises a bicycle frame, wherein the cassette of sprockets is axially movable on the driver element between two extreme positions, and wherein in at least one of the two extreme positions an axial spacing between a sprocket of the cassette and the bicycle frame is at most 2 mm. Optionally, in at least one of the two extreme positions an axial spacing between a sprocket of the cassette and the bicycle frame is at least 2 mm. More particular. the bicycle frame may include a fork with a pair of dropouts for receiving a wheel axle therebetween, e.g. a thru-axle, wherein the cassette of sprockets is rotatable about the wheel axle and may be axially movable to an axial position in which a sprocket, e.g. a smallest sprocket, of the cassette and a dropout of the pair of dropouts are axially spaced from each other by at most 2 mm.

According to a third aspect is provided a method for operating a bicycle transmission system as described in the present application.

It will be appreciated that any of the aspects, features and options described in view of the bicycle transmission system apply equally to the method for operating a bicycle, and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Figure 1A:
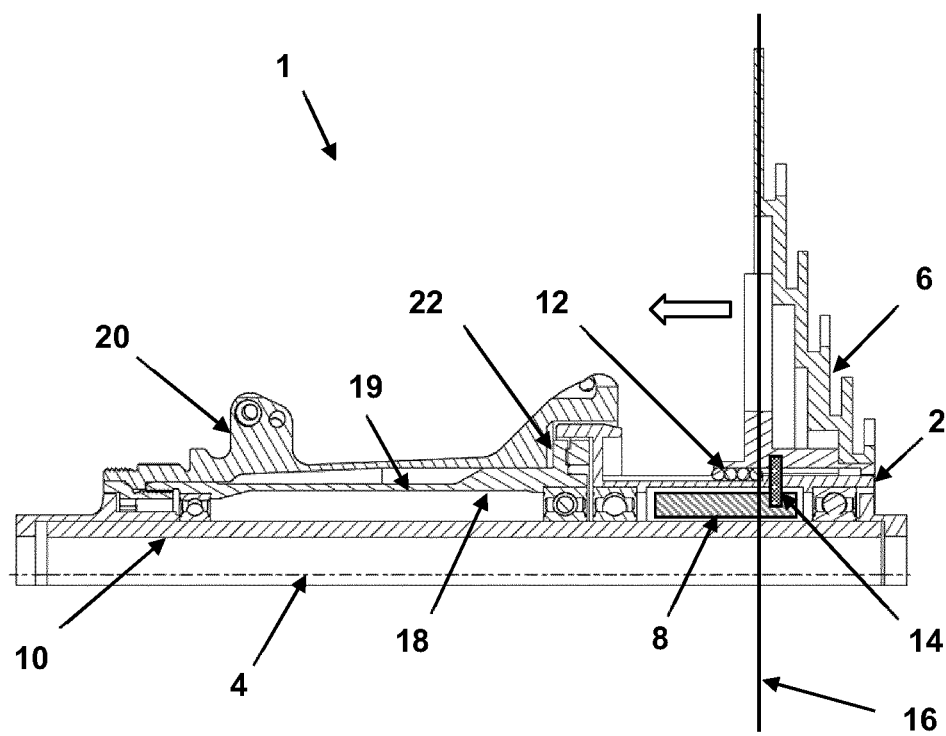
FIG. 1A shows an example of a transmission system for a bicycle with the cassette of sprockets distal to a bicycle frame.
Figure 1B:
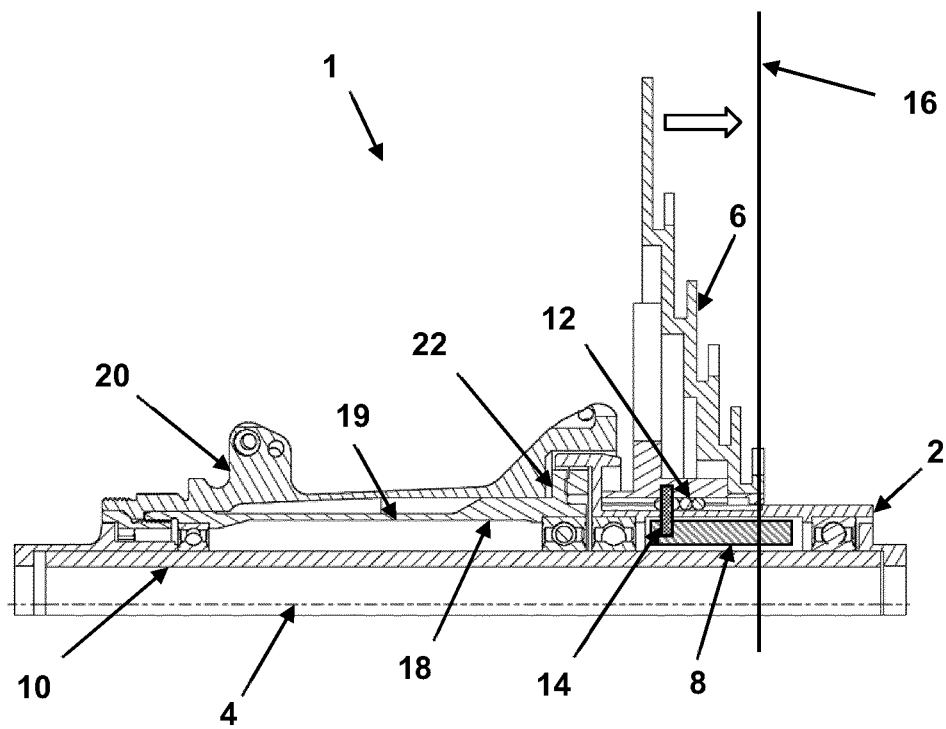
FIG. 1B shows an example of a transmission system for a bicycle with the cassette of sprockets proximal to a bicycle frame.

FIGS. 1A and 1B show examples of a transmission system 1 for a bicycle. The transmission system 1 comprises a driver element 2. The driver element 2 is configured and arranged to rotate about an axis 4. The transmission system 1 comprises a cassette of sprockets 6. Here, the cassette has six sprockets, but it will be appreciated the cassette may have any other number of sprockets, such as one, two three, four, five, seven, eight or nine sprockets.

The sprockets are arranged to selectively engage an endless drive member 16. The endless drive member 16 is here embodied as a chain, but it will be appreciated that other options are also possible, such as a belt. The sprockets of the cassette are, here, fixed to each other. The sprockets of the cassette 6 are, in this example, arranged in geometrical order. The sprockets particularly extend in parallel sprocket planes, which sprocket planes are parallel to a drive plane in which the endless drive member 16 extends.

The cassette of sprockets 6 is mounted on the driver element 2 to rotate together. The cassette of sprockets can be driven via the endless drive member 16. The endless drive member may for example also engage a front chain wheel of the bicycle attached to a crank.

Torque can be transmitted between the cassette of sprockets 6 and the driver element 2 about the axis 4. The cassette 6 and the driver element 2 are movable relative to one another in axial direction. The cassette of sprockets 6 is in this example particularly movable in axial direction relative to the driver element 2 from a first position as shown in FIG. 1A, and a second position as shown in FIG. 1B.

The transmission system 1 comprises a shifting unit. The shifting unit is arranged to move the cassette of sprockets 6 in axial direction on the driver element 2, so as to select an appropriate sprocket. In particular, the shifting unit is arranged to axially move the cassette 6, so as to align any one of the sprockets with the endless drive member 16. FIG. 1A shows a first outermost, here the largest, sprocket of the cassette 6 being aligned with the endless drive member 16, and FIG. 1B shows a second outermost, here the smallest sprocket of the cassette 6 being aligned with the endless drive member 16. Hence, the cassette 6 can be moved in axial direction between two axially extreme positions, here an axially outward most position as shown in FIG. 1A, and an axially inward most position as shown in FIG. 1B. It will be appreciated that the cassette may assume any position in between the inward and outward most positions, to align any sprocket in between the two outermost sprockets with the endless drive member 16. The shifting unit may be arranged to axially move the cassette between indexed axial positions. The shifting unit may for example move the cassette between a finite set of preprogrammed axial positions relative to the drive element 2. The indexing may be adapted to the cassette 6, e.g. to the number of sprockets, and the axial spacing between the sprockets. In this example, the shift unit is arranged to move the cassette 6 between six preprogrammed axial positions, each position corresponding to a sprocket of the cassette 6 being aligned with the endless drive member 16.

The drive plane in which the endless drive member extends, is preferably fixed relative to the driver element 2, and is for example positioned approximately halfway between opposite axial ends of the driver element 2. In this example, an axial dimension of the cassette 6, here a axial distance between the largest sprocket and the smallest sprocket, is approximately half of the distance between opposite axial ends of the driver element 2.

Figure 2A:
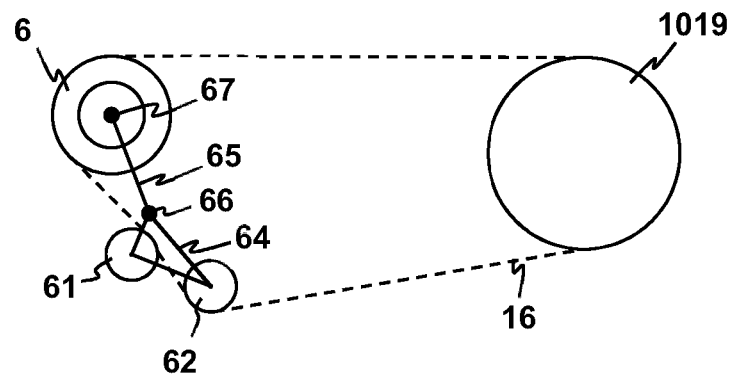
FIGS. 2A and 2B show a schematic example of a tensioner.
Figure 2B:
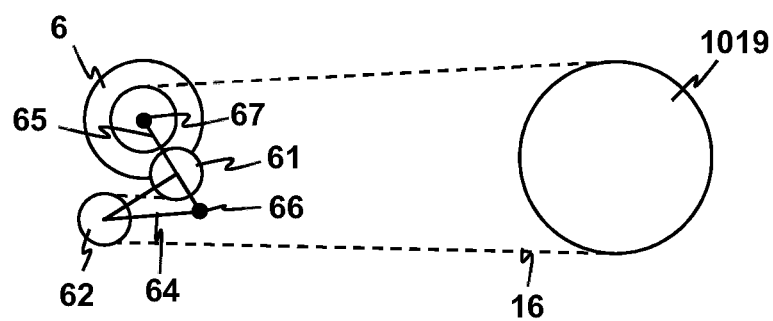

The system 1 can further comprise a tensioner 60 for tensioning the endless drive member 16. An schematic example of a tensioner is shown in FIGS. 2A and 2B. The tensioner 60 can comprise two pulley wheels 61, 62 and a spring. The tensioner can further comprise a friction element arranged to generate friction in at least one direction of motion of the endless drive member 16.

The shifting unit comprises an actuator element 8. The actuator element 8 is arranged to actuate the movement of the cassette of sprockets 6 on the driver element 2. The actuator element 8 is in this example at least partially positioned between the driver element 2 and the axis 4. The actuator element 8 is may additionally or alternatively be positioned at least partially in axial direction next to the driver element 2. In FIG. 1A the cassette of sprockets 6 is shown in an outward axial position. In FIG. 1B the cassette of sprockets 6 is shown in an inward axial position.

The transmission system 1 can comprise an axle 10, e.g. a hollow axle, coaxially arranged with respect to the driver element 2, and the driver element 2 can be rotatable around the axle 10 about the axis 4. The axle 10 can be at least partially formed by a wheel axle, e.g. a rear wheel axle of a bicycle. The axle 10 may be fixed to a frame of the bicycle, for example between dropouts of the frame. The actuator element 8 is, here, positioned between the driver element 2 and the axle 10. The actuator element 8 is in this example mounted on the axle 10. The actuator element 8 can alternatively be positioned inside the axle 10, e.g. in a cavity of the axle 10. The actuator element 8 can comprise an electric motor. The actuator element 8 can be powered by a power source, e.g. an electric power source such as a battery, wherein the power source can be mounted on or inside the axle 10.

The transmission system 1 can further comprises a torque transfer element 12. The torque transfer element 12 can be arranged to transfer torque from the cassette of sprockets 6 to the driver element 2 in a rotational direction about the axis 4 and to allow for a relative movement between the cassette of sprockets 6 and the driver element 2 in an axial direction. The torque transfer element 12 can comprise a spring member arranged to flex in axial direction for allowing the relative axial movement between the cassette of sprockets 6 and the driver element 2. The transmission system 1 can further comprise a position sensor arranged to sense a relative position of the cassette of sprockets 6 and the driver element 2.

The transmission system 1 can further comprise a force transfer element 14 arranged for transferring a force in axial direction between the actuator element 8 and the cassette of sprockets 6. The force transfer element 14 can be rotationally coupled to the driver element 2. The force transfer element 14 can be rotatable, e.g. together with the driver element 2, relative to the actuator element 8. Alternatively, the force transfer element can be rotationally coupled to the actuator element, and can be rotatable relative to the driver element 2. The position sensor can be positioned between the force transfer element 14 and the axle 10. Switching the endless drive member from one sprocket to the next can be induced by rotation of the driver element 2. The sprockets can be spaced equidistantly from each other in axial direction. The sprockets can be axially spaced from each other with a distance of less than 3.5 mm, preferably less than 3.3 mm, more preferably less than 3.0 mm. The cassette of sprockets 6 comprises at most 9 sprockets, such as at most 8, 7, 6 or 5 sprockets.

The transmission system 1 can further comprise a hub transmission 18. The hub transmission 18 can impose at least a first transmission ratio and a second transmission ratio between the driver element 2 and a hub shell. The hub transmission 18 is in this example, at least partially, positioned in axial direction next to the driver element 2. The system 1 can further comprise a hub shell 20. The hub shell here contains the hub transmission, e.g. the hub shell can be positioned diametrically adjacent to the hub transmission 18. The hub shell 20 can be removably couplable to the hub transmission 18, to allow a wheel change without having to change the hub transmission 18. The system 1 can further comprise a first freewheel 22 arranged between the driver element and an input of the hub transmission 18, to allow relative rotation between the driver element 2 and the hub transmission 18 input in one direction, e.g. a non-driving direction, and transmit torque in the opposite direction, e.g. a driving direction.

FIGS. 2A and 2B show a schematic example of a tensioner 60. The tensioner 60 comprises an upper pully wheel 61 and a lower pully wheel 61. The tensioner 60 also comprises a cage member 64. The upper and lower pully wheels 61, 62 are rotatably mounted to the cage member 64. The tensioner 60 also comprises a base member 65. The base member 65 can be, e.g. pivotably, mounted to the bicycle frame. The cage member 64 is here pivotable about a first pivot axis 66. Hence, here, the upper and lower pully wheels 61, 62 are pivotable, along with the cage member 64, about the first pivot axis 66. The upper and lower pullies 61, 62 extend in the same plane, which plane particularly corresponds to drive plane in which the endless drive member 16 extends.

Here, the upper and lower pully wheels 61, 62 are jointly pivotable about the first pivot axis 66, but it will be appreciated that the first and second pully wheels 61, 62 may be independently pivotable about the first pivot axis 66. For example, the cage member 64 may include a first pivot arm associated with the first pully wheel 61 and a second pivot arm associated with the second pully wheel 62, wherein the first and second pivot arms are independently pivotable about the first pivot axis 66.

The base member 65 is here pivotable about a second pivot axis 67. The base member 65 and the cage member 64 are, here, coupled to each other at the first pivot axis 66. The base member 65 may be mounted to the frame at the second pivot axis 67. Here, the second pivot axis 67 is concentric with the cassette 6. The second pivot axis 67 and the rotational axis 4 of the cassette 6 hence coincide in this example. The second pivot axis 67 may alternatively be eccentric with respect to the cassette 6, such that the second pivot axis 67 is offset from the rotational axis 4.

Here, the first pivot axis 66 is offset from the respective rotation axis of the upper and lower pully wheels 61, 62. The first pivot axis 66 may alternatively coincide with the rotation axis of the upper pully wheel 61.

FIG. 2A shows the tensioner 60 in a first state, associated with the endless drive member 16 engaging a relatively large-radius sprocket of the cassette 6. FIG. 2B shows the tensioner 60 in a second state associated with the endless drive member 16 engaging a relatively small-radius sprocket of the cassette 6. To account for the radius difference between the sprockets, in relation to the fixed length of the endless drive member 16, the tensioner 60 is movable between the first state and the second state, in accordance with the endless drive member 16 being shifted between the sprockets of the cassette. It will be appreciated that the cassette 6 may include more than two sprockets, for example sized between the sprockets shown in FIGS. 2A, 2B, and that the tensioner can accordingly assume a state between the first and second state. The first and second states as shown in FIGS. 2A and 2B may correspond to respective extreme states of the tensioner 60. The tensioner 60 may be spring biased towards the second state, as shown in FIG. 2B. A resistance mechanism may be provided to provide a friction resistance to the movement of the tensioner 60 between the first and second state, to prevent bouncing of the endless drive member 16 and facilitate shifting of the endless drive member 16 while riding. As the cassette 6 can be moved laterally along the rotation axis 4, the tensioner 60 need not be moved in axial direction, along the axis 4, to effect a gear shift. The tensioner 60 may hence be maintained in an axially fixed position relative to the driver element in use.

Figure 3A:
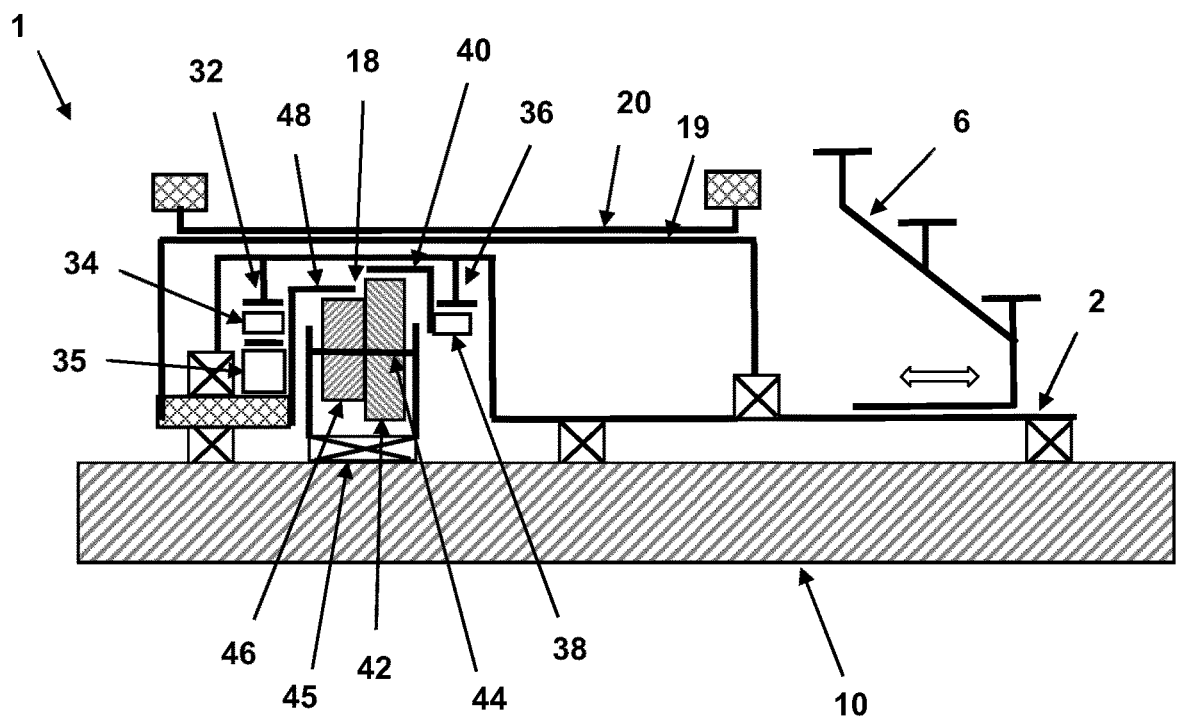
FIGS. 3A and 3B show schematic representations of respective examples of a transmission system comprising a hub transmission.
Figure 3B:
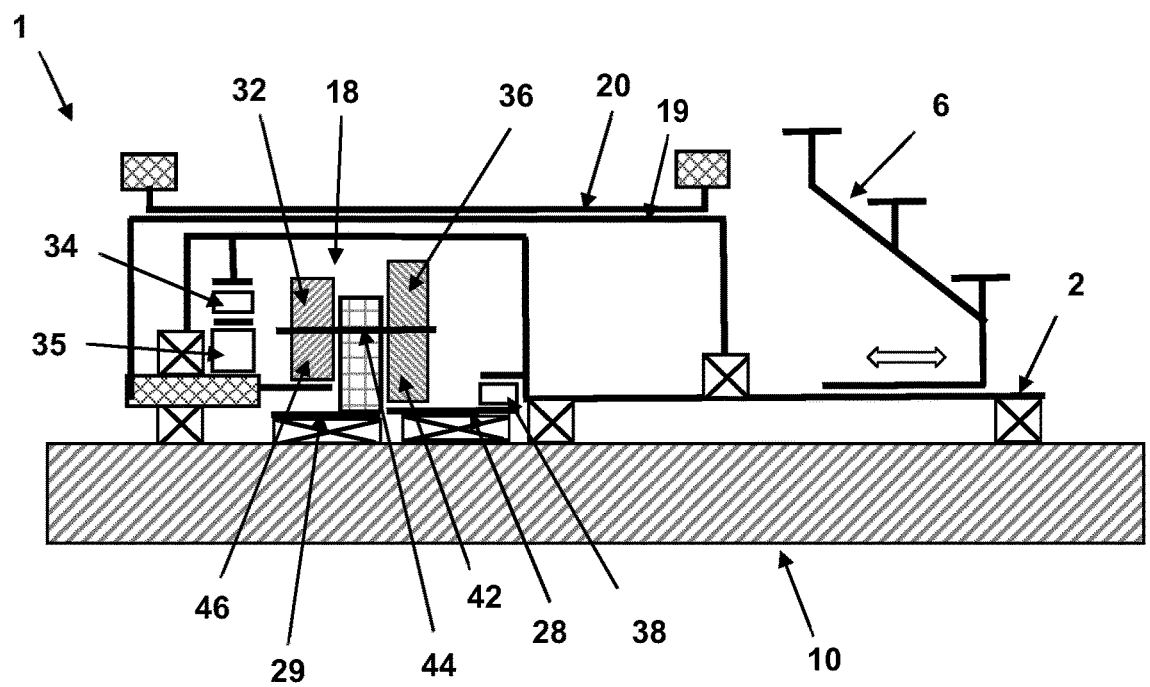

FIGS. 3A and 3B show a schematic representation of respective examples of a transmission system 1 comprising an exemplary hub transmission 18. The hub transmission 18 is, here, operable according to two transmission ratios, e.g. a first transmission ratio and a second transmission ratio. The first transmission ratio may be a 1:1 ratio. The second transmission ratio may be a speed reducing or increasing transmission ratio, wherein the driver element 2 is coupled to the hub shell 20 via, e.g. a reduction step or increase step imposed by a planetary gear system 21. It will be appreciated that the hub transmission 18 can also be operable according to more than two transmission ratios, such as three or four transmission ratios. In this example, the hub transmission 18 comprises a planetary gear system. In the example of FIG. 3A, the planetary gear system is in particular a sunless planetary gear system, including a ring gear, here two differently sized ring gears 32, 36, a planet gear, here two differently sized planet gears 42, 46, and a planet carrier 44. In the example of FIG. 3B, the planetary gear system is in particular a ringless planetary gear system, including a sun gear, here two sun gears 28, 29, a planet gear, here two differently sized planet gears 42, 46, and a planet carrier 44.

The hub transmission 18 is here provided between the hub shell 20 and the axle 10. The hub transmission 18 includes an intermediate shell 19 which forms an output of the hub transmission 18. The intermediate shell 19 is detachably couplable to the hub shell 20, such that the hub transmission 18, and the driver element 2 and cassette 6, can be separated from the wheel. This way, a wheel of the bicycle can be changed, without having to change the hub transmission 18, driver element 2 and cassette 6.

The driver element 2 is here integrated with an input of the hub transmission 18, here comprising by a first gear wheel 32 and a second gear wheel 36. The first gear wheel 32 and the second gear wheel 36 are in this example rigidly connected to each other.

The first gear wheel 32 is couplable to the intermediate shell 19, here via a freewheel 34 and clutch 35, for operating the hub transmission according to a first transmission ratio, here a 1:1 transmission ratio. The driver element 2 is also connected, here integrated, to the second gear wheel 36, which in turn is couplable to a first ring gear 40 via a second clutch freewheel 38, for operating the hub transmission according to a second transmission ratio. The first ring gear 40 is arranged to engage a first planet gear 42. The first planet gear 42 is mounted on a carrier 44 to rotate together about the axle 10, here facilitated by one-way bearing 45. The second planet gear 46, here rigidly coupled to the first planet gear 44, is arranged to engage a second ring gear 48. The second ring gear 48 is connected to, here integrated with, the intermediate shell 19. The second planet gear 46, in this example has a smaller outer diameter than the first planet gear 42. Also, the second ring gear 46 has a smaller diameter than the first ring gear 40.

It will be appreciated that the hub transmission 18 as described herein need not only be combined with an axially movable cassette of sprockets 6, but may also be used in combination with an axially stationary cassette 6, e.g. conventional derailleur systems. The hub transmission can for example also be used with an axially stationary cassette of sprockets 6 that contains only one sprocket.

Figure 4:
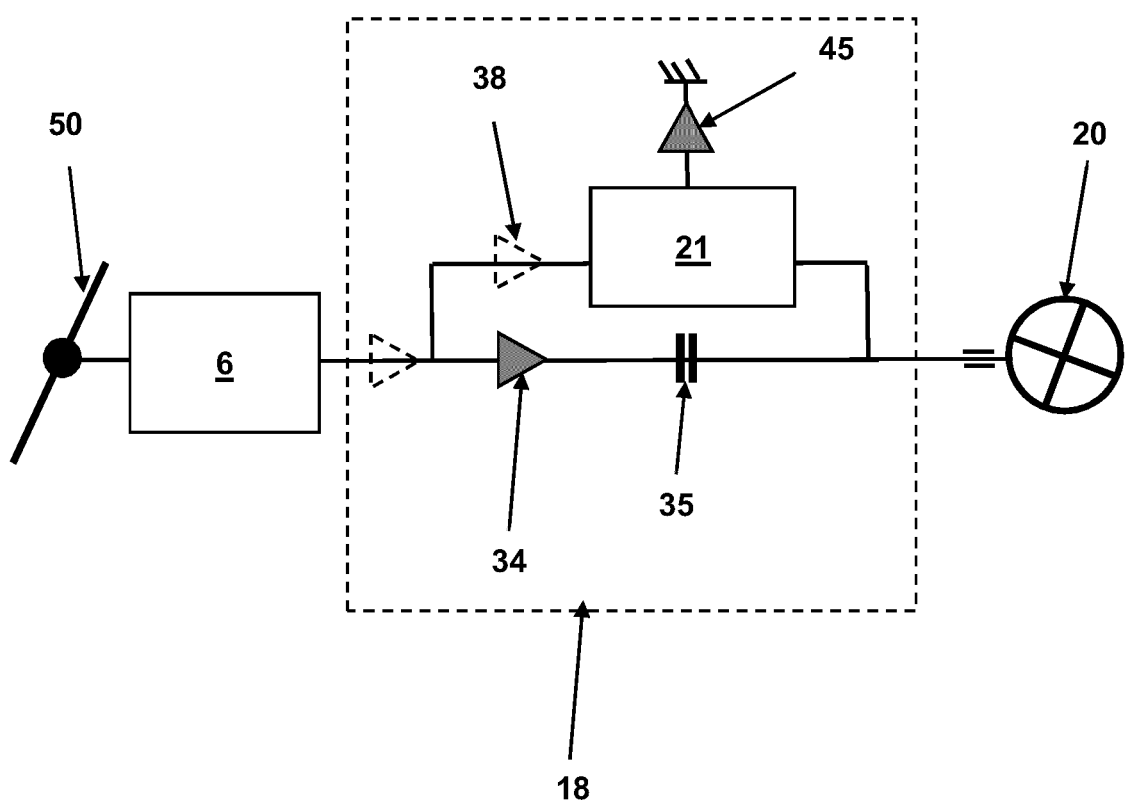
FIG. 4 shows a schematic representation of an example of a transmission system for selectively engaging two transmission modes.

FIG. 4 shows a schematic representation of an example of a transmission system, e.g. as shown in the examples of FIGS. 3A, 3B. A crank 50 is provided which may be connected to front chain wheel. The front chain wheel may be selectively coupled to one of the sprockets of the cassette 6, via an endless drive member 16, e.g. a chain or belt. The cassette 6 is couplable to the hub shell 20, e.g. via the intermediate shell 19, through the freewheel 34 and the clutch 35. In a closed state of the clutch 35, a first transmission path is formed from the crank 50 to the hub shell 20, via the cassette 6, and via a 1:1 transmission ratio of the hub transmission 18. Here, the first transmission path bypasses the planetary gear system 21. In an open state of the clutch 35, a transmission path is formed from the crank 50 to the hub shell 20, via the cassette 6 and via the planetary gear system 21 of the hub transmission 18 to the hub shell 20. The second freewheel 38 is arranged between the input of the crank 50 and the output to the hub shell 20. The hub shell 20 may be connected to a rear wheel of a bicycle.

Table 1 shows an example of system transmission ratios that can be obtained with a transmission system as described herein, particularly as shown in FIG. 4.

TABLE 1

| | Sprocket teeth | Front chain wheel teeth | Cassette transmission ratio | Hub transmission ratio | System transmission ratio | step |
|---|---|---|---|---|---|---|
| 1 | 12 | 32 | 2.67 | 1 | 2.67 | |
| 2 | 12 | 32 | 2.67 | 1.12 | 2.38 | 1.12 |
| 3 | 15 | 32 | 2.13 | 1 | 2.13 | 1.12 |
| 4 | 15 | 32 | 2.13 | 1.12 | 1.90 | 1.12 |
| 5 | 19 | 32 | 1.68 | 1 | 1.68 | 1.13 |

TABLE 1-continued

| Sprocket teeth | Front chain wheel teeth | Cassette transmission ratio | Hub transmission ratio | System transmission ratio | step |
|---|---|---|---|---|---|
| 6 | 19 | 32 | 1.68 | 1.12 | 1.50 | 1.12 |
| 7 | 24 | 32 | 1.33 | 1 | 1.33 | 1.13 |
| 8 | 24 | 32 | 1.33 | 1.12 | 1.19 | 1.12 |
| 9 | 30 | 32 | 1.07 | 1 | 1.07 | 1.12 |
| 10 | 30 | 32 | 1.07 | 1.12 | 0.95 | 1.12 |
| 11 | 38 | 32 | 0.84 | 1 | 0.84 | 1.13 |
| 12 | 38 | 32 | 0.84 | 1.12 | 0.75 | 1.12 |
| 13 | 48 | 32 | 0.67 | 1 | 0.67 | 1.13 |
| 14 | 48 | 32 | 0.67 | 1.12 | 0.60 | 1.12 |

Table 1 particularly shows an example in which the cassette includes seven different sprockets, having 12, 15, 19, 24, 30, 38 and 48 teeth respectively. With this cassette, and a front chain wheel having 32 teeth in this example, seven different transmission ratios are obtained. The hub transmission is operable in this example according to two different transmission ratios, here of 1 and 1.12. Accordingly, the transmission system can selectively impose 14 different system transmission ratios between an input and output, e.g. between the crank 50 and the hub shell 20. In this example, each system transmission ratio differs approximately 12%.

The hub transmission 18 is operable according to at least a first transmission ratio and a second transmission ratio. The first transmission ratio of the hub transmission is in this example 1:1 ratio. The first and second hub transmission ratios can differ from each other by at least 18%. The first and second hub transmission ratios can differ from each other by an amount that corresponds to approximately half of a sprocket ratio of a pair of consecutive sprockets of the cassette of sprockets 6. The second hub transmission ratio can be a reduction ratio, lowering the hub transmission output speed with respect to the hub transmission input speed. The second hub transmission ratio can be an increase ratio, increasing the hub transmission output speed with respect to the transmission input speed. At least one of the hub transmission ratios can be adjustable.

A control unit can be provided for controlling a transmission ratio change of the transmission system 1, e.g. using the actuator element 8 and/or a further actuator element of the hub transmission 18. The further actuator may for example be arranged for operating the clutch 35, e.g. for switching the clutch 35 from a closed state to an open state and vice versa. The control unit can be integrated with the actuator element 8. The control unit can be attached to the axle 10. The control unit can be positioned inside the intermediate shell 19 and/or the hub shell 20. The actuator element 8 can comprise a receiver arranged for receiving a wireless shift signal from a shifter of the bicycle.

Figure 5:
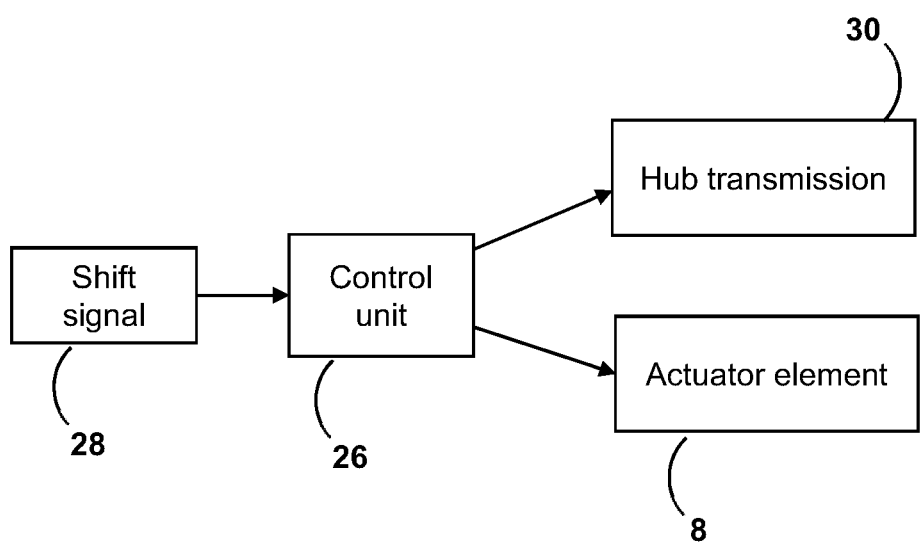
FIG. 5 shows a schematic representation of a flow chart of a control unit.

FIG. 5 shows a schematic representation of a flow chart of a control unit 26. A shift signal 28 can be transmitted to the control unit 26. The shift signal can be an upshift signal or a downshift signal, generated by a shifter attached to a bicycle handlebar. The control unit 26 can be configured to selectively control the actuator element 8 and/or the further actuator of the hub transmission 18 for selecting the next higher transmission ratio in response to receiving an upshift signal, and for selecting the next lower transmission ratio in response to receiving a downshift signal. The control unit 26 can be arranged to delay a shifting of the hub transmission 18 by a predefined time period after initiating a movement of the cassette of sprockets 6.

The transmission system 1 can further comprise an electric propulsion motor arranged for propelling the bicycle and/or an electric generator arranged for generating power. The electric motor can be coupled to the hub shell 20. The electric motor can alternatively or additionally be coupled to the crank 50 of the bicycle. The sprocket ratio steps between each pair of consecutive sprockets can be at least 12%. The sprocket ratio steps between each pair of consecutive sprockets can be at least 15%.

The hub transmission 18 can be a continuously variable transmission, e.g. a ratchet type of continuously variable transmission. A transmission ratio-spread of the continuously variable transmission can be smaller than the sprocket ratio step between a pair of consecutive sprockets. A transmission ratio-spread of the continuously variable transmission can be smaller than the sprocket ratio step between three consecutive sprockets. The continuously variable transmission can have at least a transmission ratio of 1:1, and an increase ratio increasing the hub transmission output speed with respect to the transmission input speed. An input of the continuously variable transmission can be coupled to the driver element 2 and an output of the continuously variable transmission can be coupled to the intermediate shell 19. An input of the continuously variable transmission can be coupled to the cassette of sprockets 6 and an output of the continuously variable transmission can be connected to the driver element 2. An input of the continuously variable transmission can be coupled to a crank of the bicycle and an output of the continuously variable transmission can be connected to a front chainring of the bicycle.

Figure 6A:
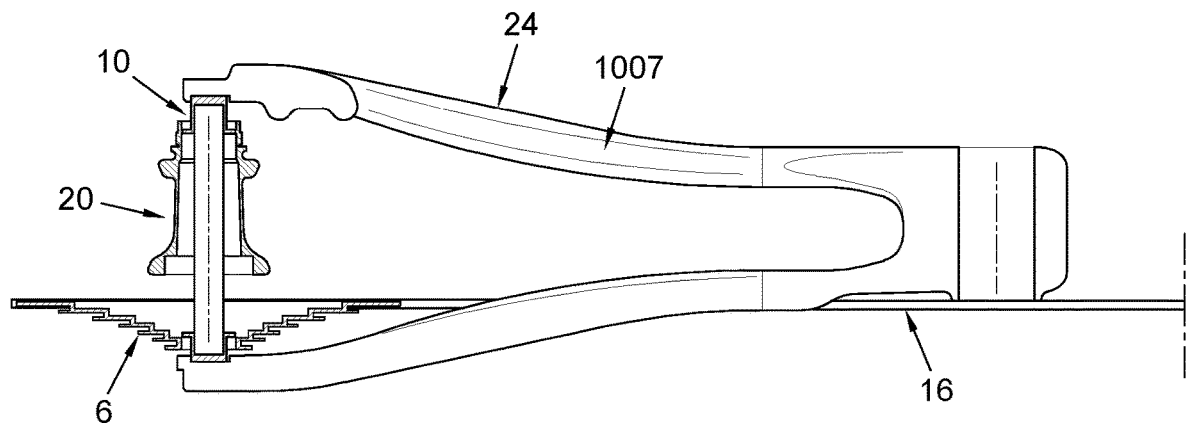
FIG. 6A shows an example of a transmission system for a bicycle mounted to a bicycle frame, wherein the cassette of sprockets is positioned distal to the bicycle frame.
Figure 6B:
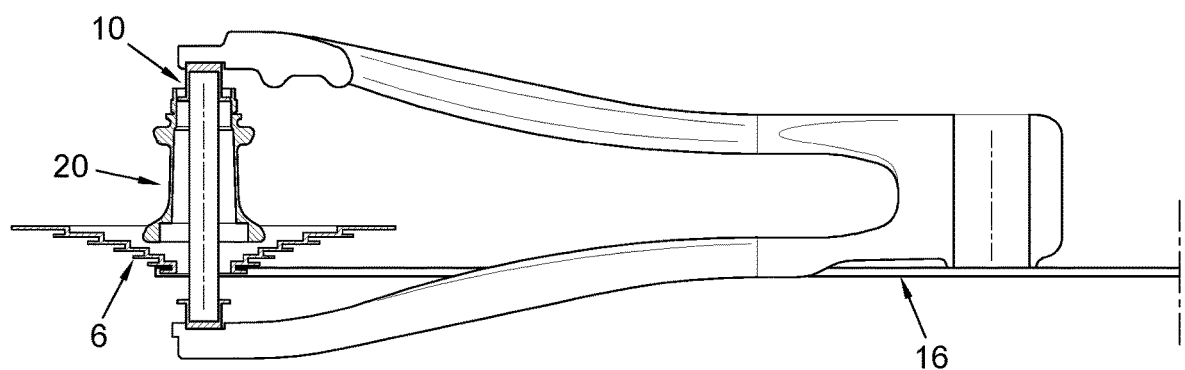
FIG. 6B shows an example of a transmission system for a bicycle mounted to a bicycle frame, wherein the cassette of sprockets is positioned proximal to the bicycle frame.

FIGS. 6A and 6B show examples of a transmission system 1 mounted to a bicycle frame 24. FIGS. 6A, 6B particular show a top view of a chain stay 1007 of the bicycle frame 24, wherein a transmission system 1 is mounted between a pair of dropouts. FIG. 6A shows the cassette of sprockets 6 at an outward most position, corresponding to the position as shown in FIG. 1A. FIG. 6B shows the cassette of sprockets 6 at an inward most position, corresponding to a position as shown in FIG. 1B. In the outward most position, as shown in FIG. 6B, the cassette of sprockets 6 is positioned close to the bicycle frame 24, wherein an outermost sprocket, here the smallest sprocket, may be axially spaced from the frame 24 by a distance of 2 mm or less. This can be achieved because the endless drive member 16 does not engage the outermost sprocket at the outermost position.

Figure 7:
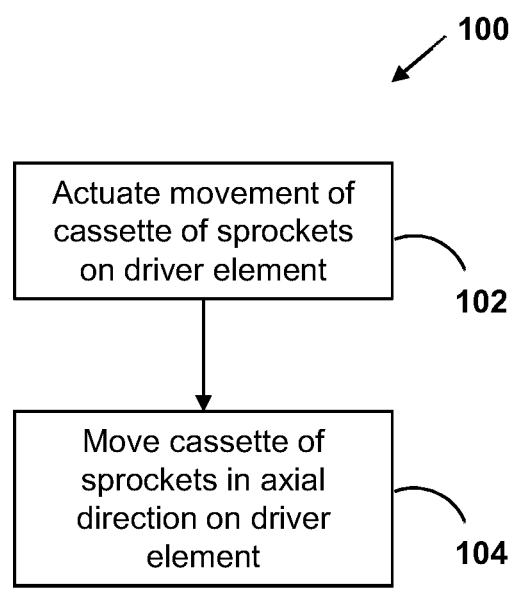
FIG. 7 shows a schematic representation of a flow chart of a method for operating a bicycle transmission system.

FIG. 7 shows a schematic representation of a flow chart of a method 100 for operating a bicycle transmission system 1. Thereto, a rotatable driver element 2 and a cassette of sprockets 6 mounted on the driver element 2 are provided. In a first step 102 the movement of the cassette of sprockets 6 on the driver element 2 is actuated. The cassette of sprockets 6 is moved in axial direction on the driver element 2 in step 104. The cassette of sprockets 6 is moved by the shifting unit. The step 104 can be performed after step 102 or in parallel with step 104.

Figure 8:
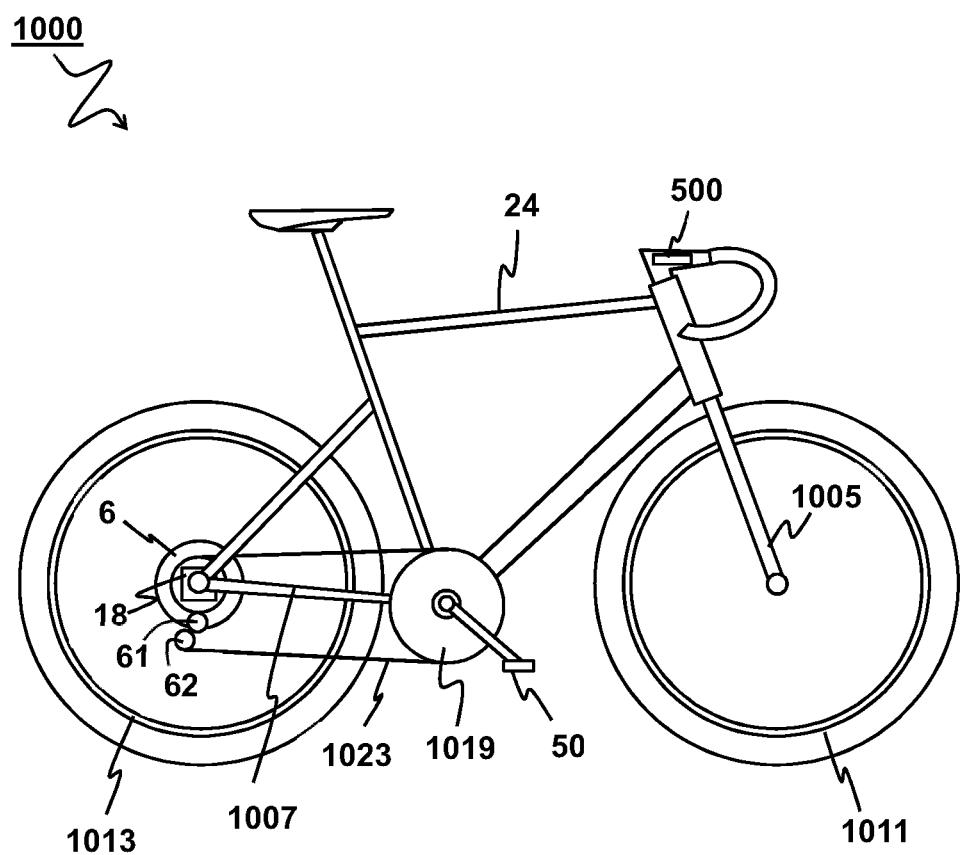
FIG. 8 shows a bicycle.

FIG. 8 shows a bicycle 1000, comprising a transmission system as described herein. The bicycle 1000 comprises a frame 24 with a front fork 1005 and a rear fork having a chain stay 1007, as well as a front wheel and a rear wheel 1011, 1013 located in the front and rear fork respectively. The bicycle 1000 further comprises a crank 50, coupled to a front chain wheel 1019, wherein an endless drive element, here a chain 1023 threads, over the front chain wheel 1019 and one of the sprockets of the cassette 6. The bicycle 1000 also comprises a control unit 500, here connected to handlebars 1031.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A transmission system for a bicycle comprising:
one cassette of sprockets including at least a first and a second sprocket and configured to rotate about a rotational axis; and
an actuator element configured to move the cassette in an axial direction of the rotational axis,
wherein the cassette is mounted on a driver element,
wherein the system further comprises a hub transmission for imposing at least a first transmission ratio and a second transmission ratio between the driver element and a hub shell, and/or between the cassette of sprockets and the driver element.

2. The system according to claim 1, wherein the actuator element is at least partially positioned between the driver element and the rotational axis, and/or wherein the actuator element is at least partially positioned in the axial direction next to the driver element or on the driver element.

3. The system according to claim 1, wherein the system further comprises an axle coaxially arranged with respect to the driver element, and wherein the driver element is rotatable around the axle about the rotational axis.

4. The system according to claim 3, wherein the actuator element is positioned between the driver element and the axle.

5. The system according to claim 3, wherein the actuator element is mounted on the axle.

6. The system according to claim 3, wherein the actuator element is positioned inside the axle.

7. The system according to claim 3, wherein the actuator element is positioned on the driver element.

8. The system according to claim 3, wherein the actuator element comprises an electric actuator and/or electric motor, wherein the actuator element is powered by a power source, wherein the power source is mounted on or inside the axle.

9. The system according to claim 1, wherein the system further comprises a torque transfer element arranged to transfer torque from the cassette of sprockets to the driver element in a rotational direction about the rotational axis and to allow for a relative axial movement between the cassette of sprockets and the driver element.

10. The system according to claim 9, wherein the torque transfer element comprises a spring member arranged to flex in axial direction for allowing the relative axial movement between the cassette of sprockets and the driver element.

11. The system according to claim 1, wherein the system further comprises a position sensor arranged to sense a relative position of the cassette of sprockets and the driver element.

12. The system according to claim 1, wherein the system further comprises a force transfer element arranged for transferring a force in axial direction between the actuator element and the cassette of sprockets.

13. The system according to claim 12, wherein the force transfer element is rotationally coupled to the driver element.

14. The system according to claim 3, wherein a position sensor is positioned between a force transfer element and the axle.

15. The system according to claim 1, wherein a shifting unit is actuated using force generated by rotation of the driver element.

16. The system according to claim 1, wherein the sprockets are axially spaced from each other with a distance of less than 3.5 mm.

17. The system according to claim 1, comprising a hub shell for coupling to a driven wheel of the bicycle, the hub shell being connected or connectable to the cassette of sprockets.

18. The system according to claim 17, wherein the system further comprises a first freewheel arranged between the driver element and an input of the hub transmission to allow relative rotation between the driver element and the hub transmission input in one rotation direction and transmit torque in a second rotation direction opposite the first direction.

19. The system according to claim 17, wherein the first and second transmission ratios differ from each other by an amount that corresponds to approximately half of a sprocket ratio of a pair of consecutive sprockets of the cassette of sprockets.

20. The system according to claim 1, wherein the system further comprises a control unit for controlling a transmission ratio change of the transmission system, controlling the first actuator element for actuating movement of the cassette of sprockets on the driver element and/or a second actuator element for actuating a transmission ratio change of the hub transmission.

21. A rear hub assembly comprising the transmission system according to claim 1.

22. A bicycle comprising a bicycle frame with a fork, and a rear wheel, having a rear hub assembly comprising the transmission system according to claim 1, arranged in the fork, wherein the cassette of sprockets is axially movable on the driver element between two extreme positions, and wherein in at least one of the two extreme positions an axial spacing between a sprocket of the cassette and the bicycle frame is at most 2 mm.

* * * * *